May 21, 1957     N. F. BARR     2,793,141
SANITARY COATING COMPOSITION, PROCESS OF COATING
METAL THEREWITH, AND COATED ARTICLE
Filed March 9, 1954
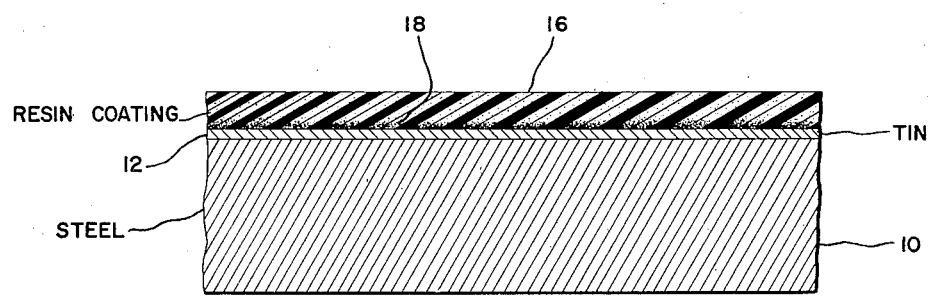
INVENTOR.
NAAMAN F. BARR

United States Patent Office 2,793,141
Patented May 21, 1957

2,793,141
SANITARY COATING COMPOSITION, PROCESS OF COATING METAL THEREWITH, AND COATED ARTICLE

Naaman F. Barr, Ross Township, Allegheny County, Pa., assignor, by mesne assignments, to American-Marietta Company, Stoner-Mudge Co. Division, Chicago, Ill., a corporation of Illinois Application March 9, 1954, Serial No. 415,167

9 Claims. (Cl. 117—132)

This invention relates to sanitary coating compositions, and metal articles coated therewith, especially in connection with containers for food and beverages.

Intensive research has long been conducted to improve the formulation of sanitary coatings for lining containers for foods and beverages and the like. The problem is to utilize various ingredients in such proportions that performance and cost characteristics can be improved where improvement is desired without sacrificing cost and performance characteristics in other respects which are also important. A sanitary coating composition must have constituents which remain compatible in solution, so that the coating will be uniform when applied. At the same time, it is advantageous to combine different constituents which are compatible in solution prior to application, but which tend to stratify when applied and baked on a metal surface, so that the combined resistive qualities of the two materials are most effectively utilized, and more importantly, so that one of the constituents can be selected to stratify toward the underlying surface and form a more perfectly adherent bond with the surface. The coating should also have sufficient bond and flexibility after baking to retain its adherence and continuity when the coated article is subsequently deformed, as in the case of forming can ends and screw caps from flat precoated sheets of metal. The coating must be impervious to attack by the food or beverage contents of a container which it lines, after pasteurization of the food or beverage in the container. Finally, the coating must not impart any off-flavor or other undesirable characteristics to the contents of the container. The latter requirement is an obstacle to the use of a number of formulations which would otherwise be satisfactory, and is the particular object of the present invention in addition to meeting the other above-stated requirements.

In accordance with my invention a coating composition is obtained in which one or a mixture of vinyl chloride and vinyl acetate copolymers are combined with one or a mixture of certain phenolic resinoids in such proportions that the combined vinyl copolymer and phenolic resinoid components are miscible and stable in solution with each other in conventional active organic solvents, but when filmed and baked on a metal substrate the resinoid component, which is thermosetting, stratifies toward the metal substrate and greatly improves adherence and thermal stability of the applied coating as a whole. The phenolic resinoid of the invention also has the vital quality of not imparting any flavor to the usual foods and beverages to which container linings are exposed.

For a graphic illustration of the coated article of the invention, reference is made to the accompanying drawing where a diagrammatic sectional view of such an article is shown (the relative thicknesses being out-of-scale, for convenience of illustration). The article comprises a sheet of electrolytic tin plate having a steel base 10 and an upper layer of tin 12. Baked on the tin is the coating 16 of the invention. The stratified phenolic resinoid component of the invention is shown diagrammatically by the dots 18.

The preferred copolymers of vinyl chloride and vinyl acetate for the purposes of the invention are those commercially available and known as "Bakelite VYHH" (copolymer of 87% vinyl chloride and 13% vinyl acetate, having an intrinsic viscosity of 0.50–0.55 measured in cyclohexanone at 20° C.) and "Bakelite VYLF" (copolymer of 87% vinyl chloride and 13% vinyl acetate, having an intrinsic viscosity of 0.22–0.26 measured in cyclohexanone at 20° C.). Varying the proportions of the vinyl chloride and vinyl acetate in the vinyl copolymer, and the inclusion of minor proportions of other ingredients in the vinyl copolymer, do not prevent such variant vinyl chloride/vinyl acetate copolymers from being used successfully for the purposes of the invention with the phenolic resinoid of the invention. For example, the phenolic resinoid of the invention has proved useful with such variant copolymers as those known as "Bakelite VMCH" (copolymer of 86% vinyl chloride, 13% vinyl acetate, and 1% interpolymerized dibasic acid; intrinsic viscosity of 0.50–0.55, measured as above-stated), and "Bakelite VAGH" (copolymer of 91% vinyl chloride, 3% vinyl acetate and 6% vinyl alcohol, as obtained by partial hydrolysis of the vinyl chloride/vinyl acetate copolymer; intrinsic viscosity of 0.55–0.59, measured as above-stated). I have found that in all cases the solids weight ratio of the vinyl chloride/vinyl acetate copolymer to the phenolic resinoid of the invention must be from 98/2 to 55/45, inclusive, for the purposes of the invention.

The phenolic resinoid of the invention is prepared by reacting (1) tri-functional or higher functional phenol, and (2) di-functional substituted phenol, with (3) formaldehyde (or equivalent aldehyde for the purpose), in the presence of (4) an alkaline catalyst. The said components (1) and (2) may consist of single or mixed tri-functional or higher phenols, and single or mixed di-functional substituted phenols, respectively, but in any case the weight ratio of components (1) and (2), as specified at the end of this paragraph, is critical for the purposes of the invention. Examples of the tri-functional and higher-functional phenol components (1) are (i) phenol; (ii) 3,5-dimethyl phenol, commonly known as sym. xylenol; (iii) 3-methyl phenol, commonly known as meta-cresol; and (iv) pp' dihydroxy diphenyl propane 2,2, commonly known as "Bisphenol A" and (v) 3-chloro phenol. Examples of the di-functional substituted phenol component (2) are (i) 2-methyl phenol; (ii) 4-phenyl phenol; (iii) 2-chloro phenol; (iv) 4-tert. butyl phenol; and (v) 4-tert. amyl phenol. For the purposes of the invention the weight ratio of the tri-functional phenol component (1) to the di-functional phenol component (2) must be from 50/50 to 10/90, inclusive, and the molar ratio of the combined phenolic components (1) and (2) to the formaldehyde component (3) must be from 1.0/0.8 to 1.0/1.5, inclusive.

In formulating phenolic resinoids from the above-stated materials the following procedure may be followed, for example: The phenolic bodies are introduced into a one liter 3-necked flask fitted with a thermometer, a reflux condenser, and a mechanical agitator. A 37% aqueous solution of formaldehyde is added and immediately thereafter the alkaline catalyst. The whole mixture is brought to a temperature of 180° to 200° F., and held at that temperature for a period of 30 minutes. The water layer is then decanted. Immediately thereafter the residue is vacuum distilled and, when free from excess water, is ready for use in the coating composition.

The materials used in the preparation of the phenolic resinoid component of the invention are illustrated by the following typical examples:

*Phenolic resinoid 2–A:*
    1.0 mole phenol ($C_6H_5OH$) (94.11 grams)
    1.0 mole para phenyl phenol (170.20 grams)
    2.0 moles formaldehyde
    0.2 mole ammonia (aqueous, as catalyst)

*Phenolic resinoid 2–B:*
    0.5 mole pp' dihydroxy diphenyl propane 2,2 ("Bisphenol A") (114.15 grams)
    1.0 mole ortho chlorophenol (128.56 grams)
    2.0 moles formaldehyde
    0.05 mole sodium hydroxide (catalyst)

*Phenolic resinoid 2–C:*
    0.5 mole 3,5-dimethyl phenol (61.08 grams)
    2.0 moles para tertiary amyl phenol (328.24 grams)
    2.5 moles formaldehyde
    0.2 mole ammonia (aqueous, as catalyst)

*Phenolic resinoid 2–D:*
    1.0 mole phenol ($C_6H_5OH$) (94.11 grams)
    1.0 mole para tertiary butyl phenol (150.21 grams)
    2.2 moles formaldehyde
    0.05 mole triethanolamine (catalyst)

*Phenolic resinoid 2–E:*
    0.5 mole 3,5-dimethyl phenol (61.08 grams)
    0.5 mole phenol ($C_6H_5OH$) (47.06 grams)
    0.5 mole para phenyl phenol (85.10 grams)
    0.5 mole para tertiary amyl phenol (82.12 grams)
    2.1 moles formaldehyde
    0.2 mole ammonia (aqueous, as catalyst)

The solvent component is preferably selected from ketones such as methyl isobutyl ketone, methyl amyl ketone, methyl propyl ketone, cyclohexanone, isophorone and mesityl oxide; esters such as ethyl acetate and 2-ethoxy ethyl acetate; nitroparaffins such as 2-nitropropane and nitroethane; ether alcohols such as 2 ethoxy ethanol and 2 butoxy ethanol; dioxane; and other suitable solvents, used singly or mixed. The solvent must include some active solvents such as esters or ketones, but useful diluents which may be included as part of the solvent are hydrocarbon solvents such as toluene, xylene, hi-flash naphtha, and their homologues, used singly or mixed. Plasticizers may be added, such as diamyl phthalate, but preferably are not included because of adverse effects on blush resistance and taste characteristics.

Typical complete coating compositions of the invention which have viscosities suitable for roller coating, are as follows (using the above-stated examples of phenolic resinoids by their above-stated designations, and referring to the above-mentioned two copolymers of 87% vinyl chloride and 13% vinyl acetate as vinyl copolymer 1–A in the case of the one having the stated intrinsic viscosity of 0.50–0.55, and as vinyl copolymer 1–B in the case of the one having the stated intrinsic viscosity of 0.22 to 0.26):

*Composition I:*
    13.8% vinyl copolymer 1–A
    9.2% phenolic resinoid 2–A
    45.0% xylene
    22.0% cyclohexanone
    10.0% 2-ethoxy ethanol

*Composition II:*
    8.0% vinyl copolymer 1–A
    8.0% vinyl resin 1–B
    7.0% phenolic resinoid 2–C
    45.0% xylene
    22.0% isophorone
    10.0% 2-butoxy ethanol

*Composition III:*
    19.4% vinyl copolymer 1–A
    0.6% phenolic resinoid 2–B
    40.0% xylene
    10.0% cyclohexanone
    30.0% methyl isobutyl ketone

*Composition IV:*
    11.0% vinyl copolymer 1–A
    9.0% phenolic resinoid 2–D
    50.0% toluene
    25.0% methyl ethyl ketone
    5.0% 2-ethoxy ethanol

*Composition V:*
    12.0% vinyl copolymer 1–B
    8.0% phenolic resinoid 2–B
    45.0% xylene
    10.0% methyl isobutyl ketone
    15.0% isophorone
    10.0% 2-butoxy ethanol

*Composition VI:*
    6.0% vinyl copolymer 1–A
    6.0% vinyl copolymer 1–B
    4.0% phenolic resinoid 2–B
    4.0% phenolic resinoid 2–E
    22.5% Solvesso 100
    22.5% xylene
    5.0% methyl amyl ketone
    5.0 methyl ethyl ketone
    15.0% isophorone
    10.0% 2-butoxy ethanol The effect of varying the ratios of the vinyl and phenolic components in the coating of my invention is illustrated in the following Table I, in which the weight ratios on a solids-basis of the vinyl and phenolic components in the above-mentioned Composition V were varied as indicated in the table. Also, the ratios of the combined vinyl and phenolic components relative to the solvent were varied to provide 20–24% solids solutions, since different ratios of the vinyl and phenolic components produce different solids concentrations which must be modified through variation of the amount of solvent in order to maintain a generally constant viscosity suitable for roll coating.

*Table 1*

| Solids ratio of vinyl copolymer to phenolic resinoid | 100/0 | 98/2 | 60/40 | 55/45 |
|---|---|---|---|---|
| (1) Flow of composition | Excellent | Excellent | Excellent | Excellent. |
| (2) When baked 10 minutes at 390° F. on ¼ lb. unsized electrolytic tinplate: | | | | |
|   (i) Thermal stability | Burned | Burned | No burn | No burn. |
|   (ii) Absence of blush after processing 30 minutes in water or steam at 250° F. (10-perfect) | | | 9 | 10. |
|   (iii) Adhesion when wet after said processing (10-perfect) | | | 10 | 10. |
|   (iv) Dry adhesion | | | 10 | 10. |
| (3) When baked 10 minutes at 345° F. on ¼ lb. unsized electrolytic tinplate: | | | | |
|   (v) Thermal stability | Burned | No burn | No burn | No burn. |
|   (vi) Absence of blush after pasteurizing in water 30 minutes at 170° F. (10-perfect) | | 9 | 10 | 10. |
|   (vii) Adhesion when wet after said pasteurization (10-perfect) | | 10 | 10 | 10. |
|   (viii) Dry adhesion | | 10 | 10 | 10. |

As demonstrated in the above Table I, as little as 2% phenolic resinoid component progressively improves the thermal stability of the composition, as illustrated by the following Table II, in which compositions of the kind illustrated in Table I were baked on ¼ lb. electrolytic tinplate for 10 minutes at successively increased temperatures until burning was observed by visual inspection:

Table II

| Solids ratio of vinyl copolymer to phenolic resinoid | 100/0 | 98/2 | 97/3 | 90/10 | 80/20 | 60/40 | 55/45 |
|---|---|---|---|---|---|---|---|
| Max. temp. of bake at 10 min. before burning observed, degrees Fahrenheit | 330 | 345 | 360 | 365 | 375 | 400 | 415 |

In the above Tables I and II the properties of coating compositions having substantially smaller proportions of vinyl component relative to phenolic resinoid component, such as 40/60, would be similar to those specified for 55/45. However, the flexibility of the coatings for purposes of fabrication into screw caps and the like, and the clarity of the coatings, would be unsatisfactory if the composition should be formulated with substantially less vinyl resin relative to phenolic resinoid than the above-specified 55/45 ratio.

The coating composition of the invention may be used to coat a wide range of both bare and primed metal surfaces, such as the above-mentioned tinplate and also blackplate (steel) and aluminum, with substantially the same results as specified above in regard to bare tinplate, and may be applied in any of the conventional ways, such as brushing, roller coating, dipping and spraying. The preferred baking temperatures are those close to the maximum temperatures shown in Table II, and for most purposes the preferred composition has as its vinyl and phenolic components the above-mentioned vinyl copolymer 1–A and phenolic resinoid 2–B in solids ratio of substantially 60/40. Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A sanitary coating composition suitable for use in lining food and beverage containers when applied on metal surfaces and baked at high temperatures, consisting essentially of the following components: (1) a copolymer of vinyl chloride and vinyl acetate; (2) an organic solvent, and (3) thermosetting phenolic resinoid consisting of the reaction product of co-condensation of the combination of (i) a phenolic compound which is at least tri-functional, and (ii) a di-functional phenolic compound, with (iii) formaldehyde in the presence of an alkaline catalyst; said tri- and higher functional phenolic compound (i) and difunctional phenolic compound (ii) being in proportions by weight from 50/50 to 10/90, inclusive, the molar ratio of the combined phenolic compounds (i) and (ii) to formaldehyde being 1.0/0.8 to 1.0/1.5, inclusive, and said copolymer component (1) and resinoid component (3) having a solids weight ratio from 98/2 to 55/45, inclusive; said copolymer and resinoid components (1) and (3) being compatible and fully dissolved in said solvent, and said composition being capable of being filmed onto a metal surface and of being baked thereon at a temperature of at least 340° F. with the phenolic resinoid stratified toward the metal surface.

2. A sanitary coating composition suitable for use in lining food and beverage containers when applied on metal surfaces and baked at high temperatures, consisting essentially of the following components: (1) a copolymer of vinyl chloride and vinyl acetate; (2) an organic solvent, and (3) thermosetting phenolic resinoid consisting of the reaction product of co-condensation of the combination of (i) a phenolic compound which is at least tri-functional selected from the group consisting of phenol; 3,5-dimethyl phenol; 3-methyl phenol; pp' dihydroxy diphenyl propane 2,2; 3-chloro phenol; and mixtures thereof, and (ii) a difunctional phenolic compound selected from the group consisting of 2-methyl phenol; 4-phenyl phenol; 2-chloro phenol; 4 tertiary butyl phenol; 4 tertiary amyl phenol; and mixtures thereof, with (iii) formaldehyde in the presence of an alkaline catalyst; said tri- and higher functional phenolic compound (i) and di-functional phenolic compound (ii) being in proportions by weight from 50/50 to 10/90, inclusive, the molar ratio of the combined phenolic compounds (i) and (ii) to formaldehyde being 1.0/0.8 to 1.0/1.5, inclusive, and said copolymer component (1) and resinoid component (3) having a solids weight ratio from 98/2 to 55/45, inclusive; said copolymer and resinoid components (1) and (3) being compatible and fully dissolved in said solvent, and said composition being capable of being filmed onto a metal surface and of being baked thereon at a temperature of at least 340° F. with the phenolic resinoid stratified toward the metal surface.

3. The sanitary coating composition of claim 2, in which the phenolic compound (i) is pp' dihydroxy diphenyl propane 2,2.

4. The sanitary coating composition of claim 2, in which the phenolic compound (ii) is 4-phenyl phenol.

5. A process of coating a metal surface to be used as part of a container for foods and beverages and the like, comprising the steps of filming on the metal surface a liquid composition consisting essentially of the following components: (1) a copolymer of vinyl chloride and vinyl acetate; (2) an organic solvent, and (3) thermosetting phenolic resinoid consisting of the reaction product of co-condensation of the combination of (i) a phenolic compound which is at least tri-functional; and (ii) a di-functional phenolic compound; with (iii) formaldehyde in the presence of an alkaline catalyst; said tri- and higher functional phenolic compound (i) and di-functional phenolic compound (ii) being in proportions by weight from 50/50 to 10/90, inclusive, the molar ratio of the combined phenolic compounds (i) and (ii) to formaldehyde being 1.0/0.8 to 1.0/1.5, inclusive, and said copolymer component (1) and resinoid component (3) having a solids weight ratio from 98/2 to 55/45, inclusive; said copolymer and resinoid components (1) and (3) being compatible and fully dissolved in said solvent; and baking said filmed composition on the metal surface until the phenolic resinoid thermosets, said phenolic resinoid being stratified toward the metal surface on which it is baked.

6. An article having a metal surface coated in accordance with claim 5.

7. A process of coating a metal surface to be used as part of a container for foods and beverages and the like, comprising the steps of filming on the metal surface a liquid composition consisting essentially of the following components: (1) a copolymer of vinyl chloride and vinyl acetate; (2) an organic solvent, and (3) thermosetting phenolic resinoid consisting of the reaction product of co-condensation of the combination of (i) a phenolic compound which is at least tri-functional selected from the group consisting of phenol; 3,5-dimethyl phenol; 3-methyl phenol; pp' dihydroxy diphenyl propane 2,2; 3-chloro phenol; and mixtures thereof, and (ii) a di-functional phenolic compound selected from the group consisting of 2-methyl phenol; 4-phenyl phenol; 2-chloro phenol; 4-tertiary butyl phenyl; 4-tertiary amyl phenol; and mixtures thereof, with (iii) formaldehyde in the presence of an alkaline catalyst; said tri- and higher functional phenolic compound (i) and di-functional phenolic compound (ii) being in proportions by weight from 50/50 to 10/90, inclusive, the molar ratio of the combined phenolic compounds (i) and (ii) to formaldehyde being 1.0/0.8 to 1.0/1.5, inclusive, and said copolymer component (1) and resinoid component (3) having a solids weight ratio from 98/2 to 55/45, inclusive; said copolymer and resinoid components (1) and (3) being compatible and fully dissolved in said solvent; and baking said filmed composition on the metal surface until the phenolic resinoid thermosets, said phenolic resinoid being stratified toward the metal surface on which it is baked.

8. The process of claim 7, in which the phenolic compound (i) is pp' dihydroxy diphenyl propane 2,2.

9. The process of claim 7, in which the phenolic compound (ii) is 4-phenyl phenol.

References Cited in the file of this patent

UNITED STATES PATENTS

| | | |
|---|---|---|
| 2,293,413 | Stoner et al. | Aug. 18, 1942 |
| 2,324,078 | Gray et al. | July 13, 1943 |
| 2,433,062 | Pfeffer et al. | Dec. 23, 1947 |